(12) United States Patent
Serov et al.

(10) Patent No.: US 9,570,761 B2
(45) Date of Patent: Feb. 14, 2017

(54) NON-PGM CATALYST FOR ORR BASED ON PYROLYSED POLY-COMPLEXES

(71) Applicants: Alexey Serov, Albuquerque, NM (US); Plamen B Atanassov, Santa Fe, NM (US); Barr Halevi, Albuquerque, NM (US); Paul Short, Albuquerque, NM (US)

(72) Inventors: Alexey Serov, Albuquerque, NM (US); Plamen B Atanassov, Santa Fe, NM (US); Barr Halevi, Albuquerque, NM (US); Paul Short, Albuquerque, NM (US)

(73) Assignee: STC.UNM, Albuquerque, NM (US)

( * ) Notice: Subject to any disclaimer, the term of this patent is extended or adjusted under 35 U.S.C. 154(b) by 0 days.

(21) Appl. No.: 14/435,762

(22) PCT Filed: Oct. 15, 2013

(86) PCT No.: PCT/US2013/064980
§ 371 (c)(1),
(2) Date: Apr. 15, 2015

(87) PCT Pub. No.: WO2014/062639
PCT Pub. Date: Apr. 24, 2014

(65) Prior Publication Data
US 2015/0263353 A1  Sep. 17, 2015

Related U.S. Application Data

(60) Provisional application No. 61/713,717, filed on Oct. 15, 2012.

(51) Int. Cl.
*B01J 23/745* (2006.01)
*H01M 4/90* (2006.01)
(Continued)

(52) U.S. Cl.
CPC ......... *H01M 4/9091* (2013.01); *B01J 31/1805* (2013.01); *H01M 4/8652* (2013.01);
(Continued)

(58) Field of Classification Search
CPC . B01J 20/3021; B01J 20/3057; B01J 20/3078; B01J 2229/37; B01J 2229/40; B01J 23/745; B01J 37/084; H01M 4/9091
(Continued)

(56) References Cited

U.S. PATENT DOCUMENTS

2006/0264325 A1* 11/2006 Wu ................... B01J 23/755
502/418
2007/0082255 A1*  4/2007 Sun .................... H01M 4/9083
429/482

(Continued)

OTHER PUBLICATIONS

Alexey Serov et al., "Templated non-PGM cathode catalysts derived from iron and poly(ethyleneimine) precursors" Applied Catalysis B: Environmental, vol. 127 (Sep. 7, 2012) pp. 300-306.
(Continued)

*Primary Examiner* — Patricia L Hailey
(74) *Attorney, Agent, or Firm* — Gonzales Patent Services; Ellen M. Gonzales

(57) ABSTRACT

Novel catalytic materials and novel methods of preparing M-N—C catalytic materials utilizing a sacrificial support approach and using inexpensive active polymers as the carbon and nitrogen source and readily available metal precursors are described.

18 Claims, 3 Drawing Sheets

Melamine (M)

Formaldehyde (F)

Urea (U)

Imidazolidinyl urea (IMDZU)

Diazolidinyl urea (DAZU)

Pyrrole-2-carboxaldehyd (2-PCA)

(51) Int. Cl.
  *B01J 31/18* (2006.01)
  *H01M 4/86* (2006.01)
  *H01M 4/88* (2006.01)
  *H01M 8/10* (2016.01)
(52) U.S. Cl.
  CPC ....... *H01M 4/8814* (2013.01); *H01M 4/8846* (2013.01); *H01M 4/8885* (2013.01); *H01M 4/9008* (2013.01); *H01M 8/1011* (2013.01); *H01M 2008/1095* (2013.01); *Y02E 60/50* (2013.01)
(58) Field of Classification Search
  USPC .................................. 502/167, 338; 977/883
  See application file for complete search history.

(56) References Cited

U.S. PATENT DOCUMENTS

| | | | | |
|---|---|---|---|---|
| 2007/0265162 A1* | 11/2007 | Zhang | ...................... | B01J 21/18 502/439 |
| 2008/0161183 A1 | 7/2008 | Popov et al. | | |
| 2008/0312073 A1* | 12/2008 | Olson | ...................... | B01J 31/06 502/164 |
| 2009/0304570 A1* | 12/2009 | Kim | ........................ | B01J 21/18 423/445 R |
| 2014/0349843 A1* | 11/2014 | Patterson | ............ | H01M 4/9041 502/182 |
| 2014/0371057 A1* | 12/2014 | Serov | ...................... | B01J 37/08 502/174 |
| 2015/0180046 A1* | 6/2015 | Serov | .................. | H01M 4/9016 423/263 |
| 2015/0295248 A1* | 10/2015 | Serov | ...................... | H01M 4/90 502/159 |
| 2015/0318557 A1* | 11/2015 | Serov | ...................... | B01J 37/08 429/532 |
| 2015/0357652 A1* | 12/2015 | Serov | .................. | H01M 4/9091 502/174 |

OTHER PUBLICATIONS

Alexey Serov et al., "Highly active and durable templated non-PGM cathode catalysts derived from iron and aminoantipyrine" Electrochemistry Communications Elsevier, Amsterdam NL. vol. 22 (May 28, 2012) pp. 53-56.

\* cited by examiner

NON-PGM CATALYST FOR ORR BASED ON PYROLYSED POLY-COMPLEXES

CROSS-REFERENCE TO RELATED APPLICATIONS

The following application claims benefit of U.S. Provisional Application No. 61/713,717, filed Oct. 15, 2012 which is hereby incorporated by reference in its entirety.

BACKGROUND

Fuel cells are receiving increasing attention as a viable energy-alternative. In general, fuel cells convert electrochemical energy into electrical energy in an environmentally clean and efficient manner. Fuel cells are contemplated as potential energy sources for everything from small electronics to cars and homes. In order to meet different energy requirements, there are a number of different types of fuel cells in existence today, each with varying chemistries, requirements, and uses.

As one example, Direct Methanol Fuel Cells (DMFCs) rely upon the oxidation of methanol on an electrocatalyst layer to form carbon dioxide. Water is consumed at the anode and produced at the cathode. Positive ions (H+) are transported across a proton exchange membrane to the cathode where they react with oxygen to produce water. Electrons can then be transported via an external circuit from anode to cathode providing power to external sources.

As another example, polymer electrolyte membrane (PEM) fuel cells (also called proton exchange membrane fuel cells) use pure hydrogen (typically supplied by a hydrogen tank) as a fuel. A stream of hydrogen is delivered to the anode side of a membrane-electrode assembly (MEA), where it is catalytically split into protons and electrons. As with the DMFC, the positive ions are transported across a proton exchange membrane to the cathode where they react with oxygen to produce water.

Currently, one of the limiting factors in the wide scale commercialization of PEM and DMFC fuel cells is the cost associated with precious metals. Both DMFC and PEM fuel cells commonly use platinum as an electrocatalyst. Nobel metals such as platinum are needed to catalyze the sluggish oxygen reduction reaction (ORR) at the cathode. One of the major routes to overcome this limitation is to increase the platinum utilization in noble-metal based electrocatalysts. Another viable route is to use a less expensive, yet still sufficiently active catalyst in larger quantities. Several classes of non-platinum electrocatalysts have been identified as having adequate oxygen reduction activity to be considered as potential electrocatalysts in commercial fuel cell applications.

Generally, known non-platinum electrocatalysts are supported on high surface area carbon blacks. This is done to increase dispersion, active surface area, and conductivity of the catalytic layer. The synthesis procedure usually includes precipitation of the precursor molecules onto the supporting substrate and pyrolyzation of the supported precursor.

Metal-Nitrogen-Carbon (M-N—C) catalysts have been found to be very promising for electrochemical oxygen reduction applications in fuel cell membrane electrode assemblies (MEAs), stacks and fuel cell systems. Critical aspects of the materials include the presence of metallic particles, conjugated carbon-nitrogen-oxide-metallic networks, and nitrogen-bonded carbon. The metallic phase includes metallic, oxide, carbide, nitride, and mixtures of these states. The chemical states and bonding of the N/C/M networks and N/C networks influences performance, for example, increased overall nitrogen content improves ORR performance. However, these systems still suffer from several significant drawbacks including: low stability in acidic environments, low durability in acid and alkaline environments, high costs of nitrogen precursors and low activity in ORR compared with platinum. The problem of low stability in acid is connected to leaching of metal from carbon-nitrogen network. Low durability in acid and alkaline solutions is explained by the evolution of significant amount of $H_2O_2$ in these environments which is corrosive for both metal and carbon-nitrogen networks. The low activity is possibly due to the low metal loading, and as a result in low concentration of active sites in such catalysts due to using external carbon source (high surface carbons like Vulcan, KetjenBlack etc).

SUMMARY

In the present disclosure a method of preparation of novel non-platinum group metal (PGM) catalytic materials based on in situ polymerization of poly-complexes on a sacrificial support using inexpensive and readily available precursors is described.

DETAILED DESCRIPTION

According to an embodiment, the present disclosure provides novel catalysts and catalytic materials and methods for making the same. According to a general embodiment, the present disclosure provides a method of forming non-PGM catalysts based on in situ polymerization and templating of multiple reactive polymer precursors on a sacrificial support followed by pyrolysis of the supported polymers and then, finally, removal of the sacrificial support. According to various embodiments, polymerization may take place prior to or simultaneously with the templating step. For the purposes of the present disclosure, the term "in situ polymerization" is used indicate that at least part of the polymerization reaction takes place while the reactants are exposed to, and thus templated on, the sacrificial support. As described in greater detail below, in some embodiments polymerization is initiated prior to exposure to the sacrificial support (multi-step synthesis), but continues after exposure to the sacrificial support, while in other embodiments (single-step synthesis) polymerization is initiated only after exposure to the sacrificial support.

Figure 1:
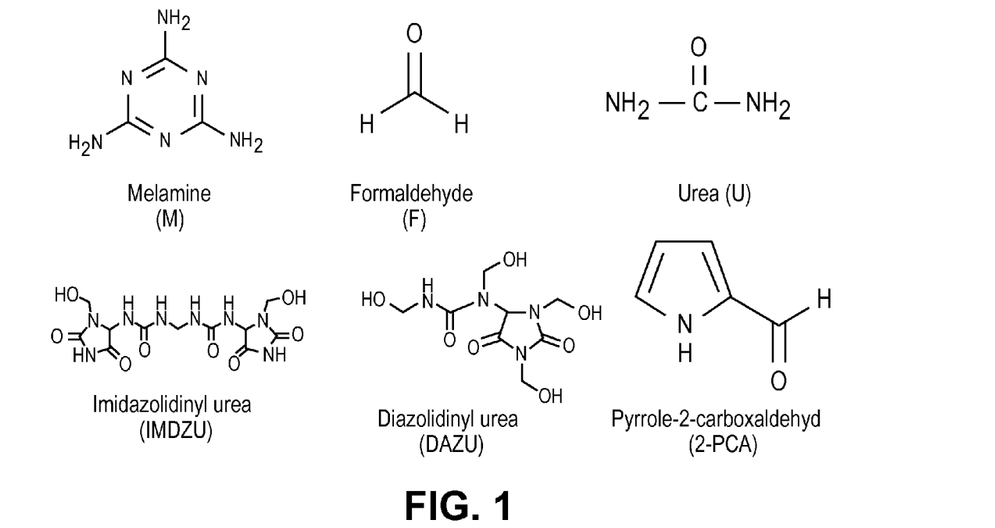
FIG. 1 is a schematic illustration of the chemical structures of exemplary polymers suitable for use in the presently disclosed methods.

According to an embodiment, the reactive polymers used in the presently described method are polymers comprising melamine, carbaldehyde, and/or carbamide (MCC) polymer precursors, which act as the source of carbon and nitrogen in the final catalytic material. According to the various examples described herein, exemplary MCC precursors suitable for use in the presently disclosed methods include melamine (M), formaldehyde (F), urea (U), imidazolidinyl urea (IMDZU), Diazolidinyl urea (DAZU), and pyrrole-2-carboxaldehyde (2-PCA) and combinations thereof. The chemical structures of these polymers are shown in FIG. 1. Other suitable materials include various combinations of ureas, melamine, and aldehyde. Of course those of skill in the art will be familiar with various chemicals and starting materials that can be used to obtain MCC polymer precursors. For example, allantoin is a starting material that can be used to synthesize both diazolidinyl urea and imidazolidinyl urea. Similarly, Dimethylformamide and Pyrrole can be combined to make Pyrrole-2-carboxaldehyde. Accordingly, the present disclosure also encompasses those materials which, under the synthesis conditions described herein or which are suitable to produce the results described herein, could be used to produce MCC polymer precursors or MCC polymers.

While other groups have produced supported catalytic materials formed from melamine and formaldehyde using high pressure and high temperature synthesis methods, the present disclosure provides simple, and inexpensive methods for producing unsupported catalytic materials at with less risk of damage to the materials being used during the synthesis process. Furthermore, as demonstrated by the variety of materials in the examples section below, the presently disclosed method is suitable for use with a wide variety of reactive polymers.

For the sake of clarity, in the present application the term "catalyst" is used to refer to a final product, suitable for use, for example, in a fuel cell, which has catalytic activity. The catalyst may include multiple types of materials, some of which may not in themselves have catalytic activity (for example, supporting material.) The term "catalytic material" is any material which has catalytic activity either on its own or as part of a catalyst.

The present disclosure provides both single-step and multi-step synthesis methods for the catalytic materials are described herein. In an exemplary single step (or one pot) synthesis method, a mixture of one or more metal precursors and one or more reactive polymer precursors are simultaneously infused and polymerized into a sacrificial support. The resulting material is then pyrolyzed and then, finally, the sacrificial support is removed. Because polymerization takes place in situ, the forming polymer is able to completely infiltrate the three dimensional structure of the sacrificial support including any and all pores, dimples, ridges, etc, producing an exact negative of the sacrificial support enabling the formation of highly complex structures with, for example, an extremely large surface area (as determined by the shape of the sacrificial support) decorated with a high concentration of metal active sites.

In general it will be appreciated that the conditions suitable to allow simultaneous polymerization and templating will be dependent on the particular materials selected for use. However, as a general example of a one-pot synthesis method, polymer precursors such as urea precursor, melamine and aldehyde precursor are mixed in a suitable solvent followed by the addition of iron precursor and the sacrificial support. Polymerization can then be achieved by an acid/base mechanism. After solvent evaporation, the resulting powder is cured in air at T=150-300° C. The dry powder can then be heat treated in an inert/reductive or reactive atmosphere at T=800-1100° C. The sacrificial support can then be removed by media in which it is soluble. According to some embodiments, after polymerization, the sacrificial support and template polymer/metal active site precursors may be ball milled to grind the particles into a fine powder.

In an exemplary multi-step method, the one or more reactive polymer precursors are mixed together first and allowed to begin to polymerize. The polymerizing polymer precursors and metal precursors are then introduced to the sacrificial support under suitable conditions to enable templating of the polymer and metal precursors on and within the sacrificial support. The method then continues as described above with regard to the one-pot synthesis method, with heat treatment followed by removal of the sacrificial support.

Whether polymerization begins prior to exposure to the sacrificial support (multi-step) or only after exposure (single-step), the presently described methods provide for in situ polymerization of the polymer around the sacrificial support. It will be appreciated that in some cases, in situ polymerization can result in a different surface chemistry between the polymerized precursor and the sacrificial support because the non-polymerized precursors have different support wetting capacity and viscosities. For example, a hydrophillic precursor will coat a hydroxyl-coated support particle so that a more complete coating of the support particle is achieved after polymerization of the precursor. In contrast, a mix of hydrophobic and hydrophilic precursors would create a non-continuous coating of the support, resulting in gaps between the support and the polymer. These gaps would become pores after pyrolysis, leading to different pore structures in the resulting catalysts. Thus, using in-situ polymerization, and by specifically selecting materials that produce the desired degree of homogeneity and nature of contact between the precursor and support, the presently described methods enable the fine tuning of the morphology of the final product in a way that cannot be achieved through mechanical mixing alone.

It will be appreciated that the sacrificial support itself may be synthesized and infused simultaneously or the sacrificial support may be synthesized first (or otherwise obtained) and then infused with the desired polymer and metal precursors. The infused sacrificial support is then subjected to heat treatment, (such as pyrolysis) in an inert ($N_2$, Ar, He, etc.) or reactive ($NH_3$, acetonitrile, etc.) atmosphere.

According to one embodiment, the sacrificial support is infused with the reactive polymer and iron precursors to produce an iron-containing catalytic material. The ratio of metal to reactive polymer precursors before synthesis may be any desirable ratio. According to various specific examples, a catalytic material may be formed with a metal to polymer precursor ratio of between 1:4 and 1:12, more specifically between 1:6 and 1:10, and more specifically of 1:8.

Suitable iron precursors include, but are not limited to, iron nitrate, iron sulfate, iron acetate, iron chloride, etc. Furthermore, it will be appreciated that other transition metals such as Ce, Cr, Cu Mo, Ni, Ru, Ta, Ti, V, W, and Zr can be substituted in place of iron, by simply using precursors of those metals instead. Examplary transition metal precursors include, but are not limited to cerium nitrate, chromium nitrate, copper nitrate, ammonium molybdate, nickel nitrate, ruthenium chloride, tantalum isopropoxide, titanium ethoxide, vanadium sulfate, ammonium tunstanate and zirconium nitrate. Furthermore, according to some embodiments the presently described methodologies may utilize precursors of two or more metals to produce multi-metallic catalysts.

Of course it will be appreciated that given the high temperatures that the sacrificial support will be subjected to during the synthesis method, it is important to select a sacrificial support which is non-reactive to the catalytic materials under the specific synthesis conditions used. Accordingly, it will be appreciated that silica is a preferred material for the sacrificial support, but that other suitable materials may be used. Other suitable sacrificial supports include, but are not limited to zeolites, aluminas, and the like. The support may take the form of spheres, particles, or other two or three dimensional regular, irregular, or amorphous shapes. The spheres, particles, or other shapes may be monodisperse, or irregularly sized. The spheres, particles, or other shapes may or may not have pores and such pores may be of the same or different sizes and shapes.

It should be appreciated that the size and shape of the silica particles may be selected according to the desired shape(s) and size(s) of the voids within the electrocatalyst material. Accordingly, by selecting the particular size and shape of silica particles, one can produce an electrocatalyst having voids of a predictable size and shape. For example, if the silica particles are spheres, the electrocatalyst will contain a plurality of spherical voids. Those of skill in the art will be familiar with the electrocatalyst Pt—Ru black, which consists of a plurality of platinum-ruthenium alloy spheres. An electrocatalyst formed from using silica spheres with the above-described method looks like a negative image of the Pt—Ru black; the space that existed as a void in the Pt—Ru black is filled with metal electrocatalyst, and the space that existed as metal electrocatalyst in the Pt—Ru black is void.

As stated above, according to some embodiments, silica spheres of any diameter may be used. In some preferred embodiments, silica particles having a characteristic length of between 1 nm and 100 nm, in more preferred embodiments, silica particles having characteristic lengths of between 100 nm and 1000 nm may be used and in other preferred embodiments, silica particles having characteristic lengths of between 1 mm and 10 mm may be used. Further mesoporous silica can also be used in the templating synthesis approach. In this case the templating involves intercalating the mesopores of the material and results in a self-supported electrocatalysts with porosity in the 2-20 nm range. In one particular embodiment, the silica template is Cabosil amorphous fumed silica (325 $m^2/g$). As stated above, because the spheres serve as the template for the formation of the electrocatalyst, in an embodiment where silica particles having an average diameter of 20 nm is used, the spherical voids in the electrocatalyst will typically have a diameter of approximately 20 nm. Those of skill in the art will be familiar with a variety of silica particles that are commercially available, and such particles may be used. Alternatively, known methods of forming silica particles may be employed in order to obtain particles of the desired shape and/or size.

As stated above, after polymerization and templating of the reactive polymer precursors and metal precursors on the sacrificial support, the material is heat treated either in an inert atmosphere such as $N_2$, Ar, or He, or in a reactive atmosphere such as $NH_3$ or acetonitrile. Inert atmospheres are typically used when the infused materials are nitrogen rich, as the inert atmosphere enables the production of a high number of active sites with Fe (or other metal) N4 centers. However, it may be desired to use a nitrogen rich atmosphere if infused material is rich in carbon and depleted in nitrogen, as the nitrogen rich atmosphere will enable production of the Fe (or other metal) N4 centers. As described in greater detail in the experimental section below, according to some preferred embodiments, the materials of the present are subjected to heat treatment in a reactive atmosphere.

According to some embodiments, particularly embodiments wherein only a single heat treatment is used, optimal temperatures for heat treatment are typically between 500° C. and 1100° C. According to some embodiments, heat treatment may preferably be between 750° C. and 900° C., or more preferably between 775° C. and 825° C. In some embodiments, heat treatment of around 800° C. is preferred, as our experimental data showed this temperature to produce catalysts having a high amount of catalytic activity for certain specific materials (see experimental section below).

After heat treatment, the sacrificial support is removed using suitable means. For example, the sacrificial support may be removed via chemical etching. Examples of suitable etchants include NaOH, KOH, and HF. According to some embodiments, it may be preferable to use KOH, as it preserves all metal and metal oxide in the catalyst and, if the species are catalytically active, use of KOH may, in fact, increase catalytic activity. Alternatively, in some embodiments, HF may be preferred as it is very aggressive and can be used to remove some poisonous species from the surface of the catalyst. Accordingly, those of skill in the art will be able to select the desired etchants based on the particular requirements of the specific catalytic material being formed.

According to some embodiments, multiple heat treatment steps may be used. In this procedure, the polymer and metal precursors are polymerized and templated on the sacrificial support (either as part of a one-pot or multi-step method), which is then subjected to a first heat treatment step, such as pyrolysis in order to produce an intermediate material that is rich with unreacted iron. The intermediate material is then subjected to a second heat treatment step, which may be, for example, a second pyrolysis treatment, resulting in newly formed active sites. After the second heat treatment, the sacrificial support is removed using chemical etching or other suitable means as described above.

In embodiments utilizing two separate heat treatment steps, it may be desirable for the different heat treatment steps to be conducted under different conditions, for example at different temperatures and/or for different durations of time. For example, the first heat treatment step may be performed at a higher temperature, such as 800° C. for 1 hr and the second heat treatment step may be performed at a temperature between 800 and 1000° C. for a period of time between 10 minutes and 1 hour.

It will be appreciated that some in some applications a mono-metallic catalyst may not be sufficiently stable or active to replace traditional platinum- or platinum alloy-based catalysts. Accordingly, as indicated above, according to some embodiments, the presently described method may incorporate the use of precursors of multiple metals in order to achieve a desired stability and/or activity.

It will be appreciated that the presently described methods enable the production of catalytic materials with a highly complex morphological structure that produces the high surface area that is extremely desirable for catalytic reactions. According to various embodiments, the catalytic materials described herein may have a surface area of at least 100

$m^2 g^{-1}$, at least 150 $m^2 g^{-1}$, at least 200 $m^2 g^{-1}$, at least 250 $m^2 g^{-1}$ or at least 300 $m^2 g^{-1}$.

According to some embodiments, it may be desirable to produce large amounts of the catalysts described herein, for example in a batch-wise process. Accordingly, the present disclosure further provides a method for large-scale preparation of the presently described catalysts. According to an embodiment, the present disclosure provides a method which combines a sacrificial support-based methodology with spray pyrolysis to produce self-supported catalysts. According to this method, the spray pyrolysis method is a continuous method while the sacrificial support-based methodology is performed batch-wise. According to an exemplary method, the polymer and metal precursor materials described herein are mixed with a silica support, atomized, and dried in a tube furnace. The powder obtained from this procedure is then collected on a filter. The collected powder is then heat treated. Finally, the sacrificial support is removed, for example by leaching with HF or KOH.

Of course it will be appreciated that the catalysts described herein may also be produced by semi-bath or continuous operation methods. For example, all of the materials could be loaded into a long screw-feeder that mixes the precursors while heating them and moves them along, resulting in raw material continuously entering on one end, and the finished precursor/support mix continuously exiting at the other end.

It will be appreciated that the above-described large-scale production method is suitable for use for a wide variety of precursors and materials and thus not necessarily limited to the catalysts disclosed herein.

The specific methods and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. The methods and processes illustratively described herein suitably may be practiced in differing orders of steps, and that they are not necessarily restricted to the orders of steps indicated herein or in the claims. As used herein and in the appended claims, the singular forms "a," "an," and "the" include plural reference unless the context clearly dictates otherwise. Thus, for example, a reference to "a catalyst" includes a plurality of such catalysts, and so forth.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

All patents and publications referenced below and/or mentioned herein are indicative of the levels of skill of those skilled in the art to which the invention pertains, and each such referenced patent or publication is hereby incorporated by reference to the same extent as if it had been incorporated by reference in its entirety individually or set forth herein in its entirety. Applicants reserve the right to physically incorporate into this specification any and all materials and information from any such cited patents or publications.

Additional information may be gathered from the Examples section below. The reaction tests shown and described in the drawings and in the following examples clearly demonstrate that catalysts prepared using the method described possess high Oxygen Reduction activity in acid media. Further, the mechanism of oxygen reduction shows the direct reduction of oxygen to water by a 4 electron pathway, preventing corrosive peroxide production and therefore improving stability and durability of catalysts. Thus, catalysts of the composition and using the preparation method described herein, including but not limited to the described materials shown herein, are effective catalysts for oxygen reduction.

EXAMPLES

I. Multi-Step Process

Synthesis and Analysis of
Fe-Imidazolidinyl-Urea-Melamine-Formaldehyde
(Fe-IMDZU-M-F) Catalysts Fe-Imidazolidinyl-Urea-Melamine-Formaldehyde (Fe-IMDZU-M-F) catalysts were prepared in two step process.

20 g of imidazolidinyl urea was dissolved in 200 ml of water. Temperature of solution was increased to 80° C. 12 g of melamine was added to solution, followed by addition of 40 ml of formaldehyde. After 30 minutes 1 ml of 1M KOH was added to solution and mixture was stirred for 1 h. 2.5 ml of concentrated H2SO4 was added to polymerize precursors. Mixture was dried on hot plate at T=145° C. Dried powder was cured at T=185° C. for 48 hours.

25 g of prepared polymer was ball-milled with 10 g of fumed silica (Cab-O-Sil™ EH-5, surface area: ~400 m2 g−1) and 2.75 g of iron nitrate. The solid was ground to a fine powder in a ball mill, and then subjected to the heat treatment (HT). The conditions of HT were: UHP N2 atmosphere flowing at a rate of 100 cc min−1, HT temperatures of 850° C., HT temperature ramp rates of 10° C. min−1, and HT durations of 1 hour. Silica support was removed by 25 wt %. HF solution at room temperature for 24 hours. Powder was washed with DI water until pH=6 and dried at T=85 C overnight.

Synthesis and Analysis of
Fe-Diazolidinyl-Urea-Melamine-Formaldehyde
(Fe-DAZU-M-F) Catalysts Fe-Diazolidinyl-Urea-Melamine-Formaldehyde (Fe-DAZU-M-F) catalysts were prepared in two step process.

43 g of diazolidinyl urea was dissolved in 400 ml of water. Temperature of solution was increased to 80° C. 23 g of melamine was added to solution, followed by addition of 140 ml of formaldehyde. After 30 minutes 1 ml of 1M KOH was added to solution and mixture was stirred for 1 h. 2.5 ml of concentrated H2SO4 was added to polymerize precursors. Mixture was dried on hot plate at T=145° C. Dried powder was cured at T=185° C. for 48 hours.

25 g of prepared polymer was ball-milled with 10 g of fumed silica (Cab-O-Sil™ H-5, surface area: ~400 m2 g-1) and 2.75 g of iron nitrate. The solid was ground to a fine powder in a ball mill, and then subjected to the heat treatment (HT). The conditions of HT were: UHP N2 atmosphere flowing at a rate of 100 cc min-1, HT temperatures of 850° C., HT temperature ramp rates of 10° C. min-1, and HT durations of 1 hour. Silica support was removed by 25 wt %. HF solution at room temperature for 24 hours. Powder was washed with DI water until pH=6 and dried at T=85 C overnight.

Synthesis and Analysis of
Fe-Urea-Melamine-Pyrrole-2-carboxaldehyde
(Fe-U-M-2PCA)

Fe-Urea-Melamine-Pyrrole-2-carboxaldehyde (Fe-U-M-2PCA) catalysts were prepared in two step process.

13 g of urea was dissolved in 100 ml of water. Temperature of solution was increased to 80° C. 23 g of melamine was added to solution, followed by addition of 120 ml of Pyrrole-2-carboxaldehyde. After 30 minutes 1 ml of 1M KOH was added to solution and mixture was stirred for 1 h. 2.5 ml of concentrated H2SO4 was added to polymerize precursors. Mixture was dried on hot plate at T=145° C. Dried powder was cured at T=185° C. for 48 hours.

25 g of prepared polymer was ball-milled with 10 g of fumed silica (Cab-O-Sil™ EH-5, surface area: ~400 m2 g-1) and 2.75 g of iron nitrate. The solid was ground to a fine powder in a ball mill, and then subjected to the heat treatment (HT). The conditions of HT were: UHP N2 atmosphere flowing at a rate of 100 cc min-1, HT temperatures of 850° C., HT temperature ramp rates of 10° C. min-1, and HT durations of 1 hour. Silica support was removed by 25 wt %. HF solution at room temperature for 24 hours. Powder was washed with DI water until pH=6 and dried at T=85 C overnight.

II. One-Pot Synthesis

Silica EH5 was dispersed in 100 ml of water. 23 g of urea was dissolved in 100 ml of water and added to silica suspension. Temperature of solution was increased to 80° C. 23 g of melamine was added to solution, followed by addition of 120 ml of Pyrrole-2-carboxaldehyde and 26 g of Fe(NO3)3. After 30 minutes 1 ml of 1M KOH was added to solution and mixture was stirred for 1 h. 2.5 ml of concentrated H2SO4 was added to polymerize precursors. Mixture was dried on hot plate at T=145° C. Dried powder was cured at T=185° C. for 48 hours. The conditions of HT were: UHP N2 atmosphere flowing at a rate of 100 cc min-1, HT temperatures of 850° C., HT temperature ramp rates of 10° C. min-1, and HT durations of 1 hour. in Silica support was removed by 25 wt %. HF solution at room temperature for 24 hours. Powder was washed with DI water until pH=6 and dried at T=85 C overnight.

Silica EH5 was dispersed in 100 ml of water. 18 g of urea was dissolved in 100 ml of water and added to silica suspension. Temperature of solution was increased to 80° C. 23 g of melamine was added to solution, followed by addition of 19 g of pyredinecarboxaldehyde and 4 g of Fe(NO3)3. After 30 minutes 1 ml of 1M KOH was added to solution and mixture was stirred for 1 h. 2.5 ml of concentrated H2SO4 was added to polymerize precursors. Mixture was dried on hot plate at T=145° C. Dried powder was cured at T=185° C. for 48 hours. The conditions of HT were: UHP N2 atmosphere flowing at a rate of 100 cc min-1, HT temperatures of 850° C., HT temperature ramp rates of 10° C. min-1, and HT durations of 1 hour. in Silica support was removed by 25 wt %. HF solution at room temperature for 24 hours. Powder was washed with DI water until pH=6 and dried at T=85 C overnight.

Silica EH5 was dispersed in 100 ml of water. 10 g of pyredinecarboxamide was dissolved in 100 ml of water and added to silica suspension. Temperature of solution was increased to 80° C. 29 g of melamine was added to solution, followed by addition of 100 ml of Pyrrole-2-carboxaldehyde and 29 g of Fe(NO3)3. After 30 minutes 1 ml of 1M KOH was added to solution and mixture was stirred for 1 h. 2.5 ml of concentrated H2SO4 was added to polymerize precursors. Mixture was dried on hot plate at T=145 ° C. Dried powder was cured at T=185° C. for 48 hours. The conditions of HT were: UHP N2 atmosphere flowing at a rate of 100 cc min-1, HT temperatures of 850° C., HT temperature ramp rates of 10° C. min-1, and HT durations of 1 hour. in Silica support was removed by 25 wt %. HF solution at room temperature for 24 hours. Powder was washed with DI water until pH=6 and dried at T=85 C overnight.

Silica EH5 was dispersed in 100 ml of water. 30 g of dimethyltetrahydropyrimidon was dissolved in 100 ml of water and added to silica suspension. Temperature of solution was increased to 80° C. 23 g of melamine was added to solution, followed by addition of 120 ml of formaldehyde and 39 g of Fe(NO3)3. After 30 minutes 1 ml of 1M KOH was added to solution and mixture was stirred for 1 h. 2.5 ml of concentrated H2SO4 was added to polymerize precursors. Mixture was dried on hot plate at T=145° C. Dried powder was cured at T=185° C. for 48 hours. The conditions of HT were: UHP N2 atmosphere flowing at a rate of 100 cc min-1, HT temperatures of 850° C., HT temperature ramp rates of 10° C. min-1, and HT durations of 1 hour. Silica support was removed by 25 wt %. HF solution at room temperature for 24 hours. Powder was washed with DI water until pH=6 and dried at T=85 C overnight.

Figure 2:
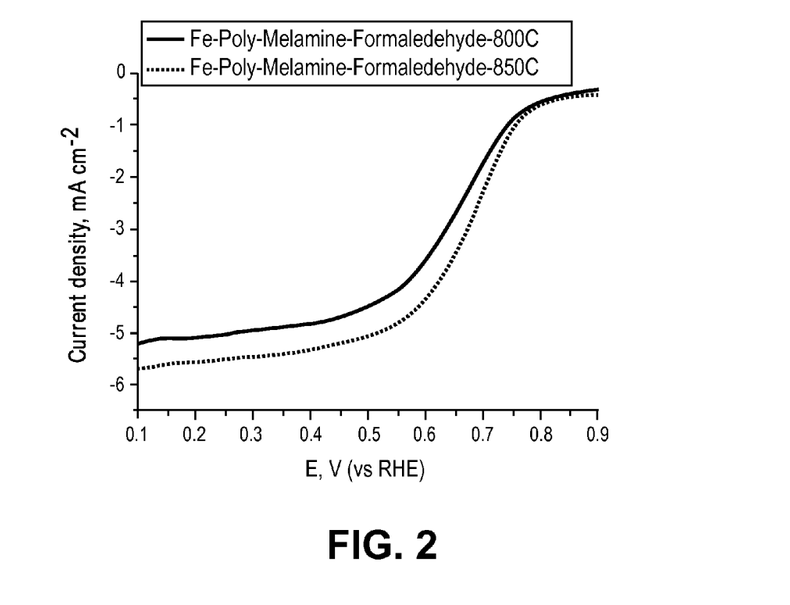
FIG. 2 shows RDE data for Fe-Poly-Melamine-Formaldehyde prepared with variation of HT temperature in 0.5M $H_2SO_4$ saturated with $O_2$ (catalyst loading: 600 μg $cm^{-2}$, 1200 RPM, 5 mV $s^{-1}$).
Figure 3:
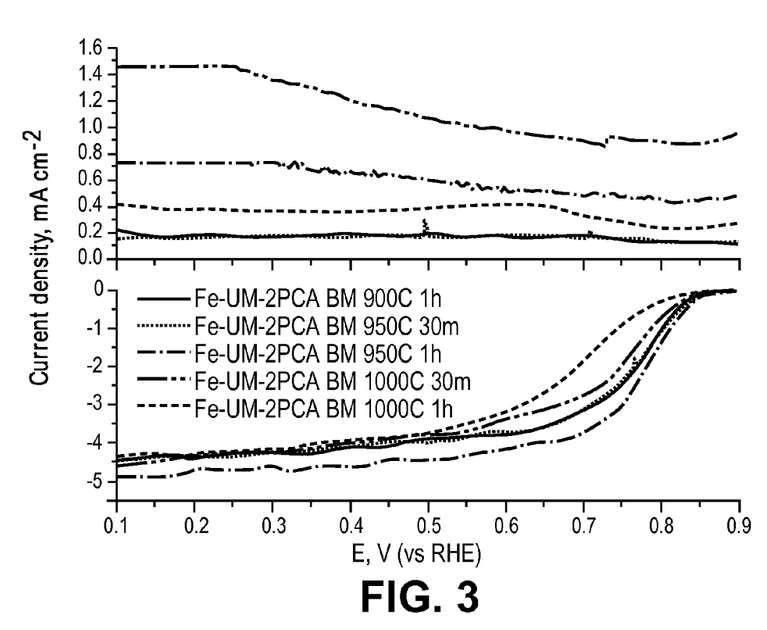
FIG. 3 shows RDE data for Fe-Poly-Urea-Melamine-Pyrrole-2-carboxaldehyde prepared with variation of HT temperature in 0.5M $H_2SO_4$ saturated with $O_2$ (catalyst loading: 600 μg $cm^{-2}$, 1200 RPM, 5 mV $s^{-1}$).
Figure 4:
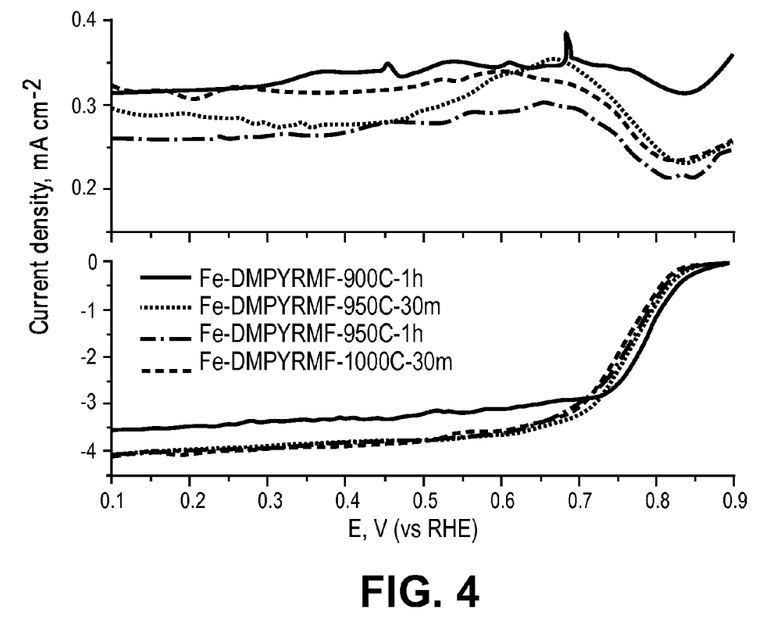
FIG. 4 shows RDE data for Fe-Poly-DimethylTetrahydroPyrimidon-Melamine-Formaldehyde prepared with variation of HT temperature in 0.5M $H_2SO_4$ saturated with $O_2$ (catalyst loading: 600 μg $cm^{-2}$, 1200 RPM, 5 mV $s^{-1}$).

RDE data for representative catalyst produced using the methods described herein are presented in FIGS. 2-4. FIG. 2 shows RDE data for Fe-Poly-Melamine-Formaldehyde prepared with variation of HT temperature in 0.5M $H_2SO_4$ saturated with $O_2$ (catalyst loading: 600 μg $cm^{-2}$, 1200 RPM, 5 mV $s^{-1}$). FIG. 3 shows RDE data for Fe-Poly-Urea-Melamine-Pyrrole-2-carboxaldehyde prepared with variation of HT temperature in 0.5M $H_2SO_4$ saturated with $O_2$ (catalyst loading: 600 μg $cm^{-2}$, 1200 RPM, 5 mV $s^{-1}$). FIG. 4 shows RDE data for Fe-Poly-DimethylTetrahydroPyrimidon-Melamine-Formaldehyde prepared with variation of HT temperature in 0.5M $H_2SO_4$ saturated with $O_2$ (catalyst loading: 600 μg $cm^{-2}$, 1200 RPM, 5 mV $s^{-1}$).

Figure 5:
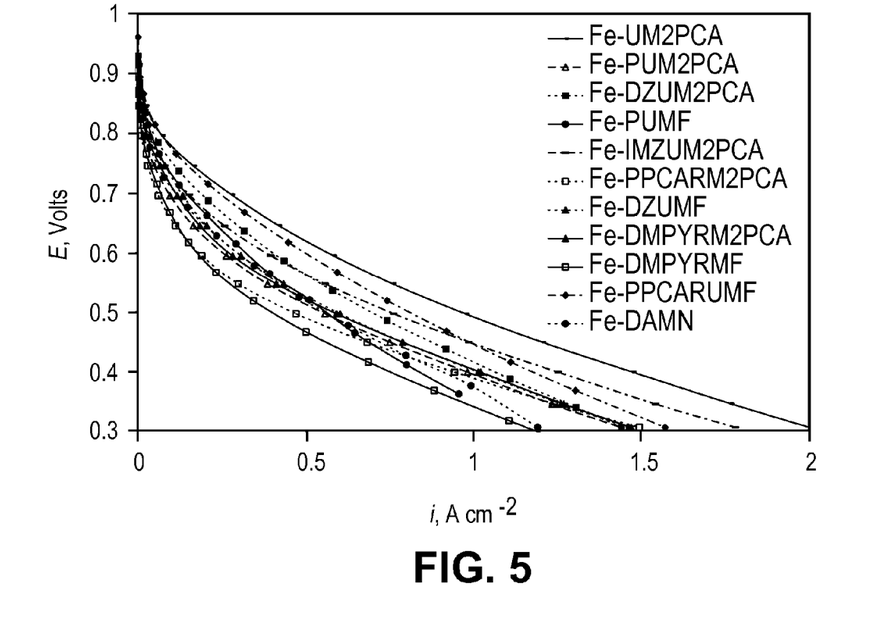
FIG. 5 shows Oxygen Reduction Reaction performance for representative catalysts produced using the methods described herein.
Figure 6:
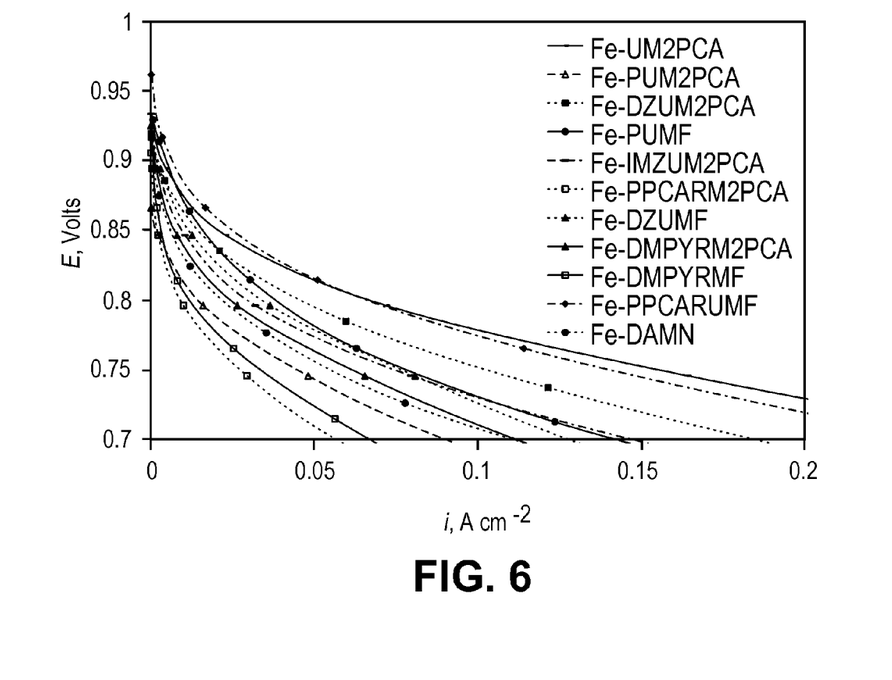
FIG. 6 also shows Oxygen Reduction Reaction performance for representative catalysts produced using the methods described herein.

Oxygen Reduction Reaction performance for representative catalysts produced using the methods described herein is presented in FIGS. 5 and 6. The performances in MEA tests demonstrate that the Non-PGM Catalyst Based on Pyrolysed Poly-Complexes are active for ORR. Further, the performance of the catalysts in the kinetic regimen of the MEA performance, shown in FIGS. 5 and 6, demonstrates that the performances of the catalysts are not kinetically limited and the true performance of these catalytic materials can be improved.

What is claimed is:
1. A method for forming a catalytic material comprising:
providing sacrificial template particles;
templating a mixture of reactive polymer precursor and a metal precursor onto the sacrificial template particles under suitable conditions to enable in situ polymerization of the reactive polymer precursors to produce a sacrificial template coated with a reactive polymer containing dispersed catalytic material precursors;

heat treating the mixture after in situ polymerization has initiated; and removing the sacrificial template particles to produce a highly dispersed, self-supported, high surface area catalytic material.

2. The method of claim 1 wherein the reactive polymer is selected from the group consisting of: melamine, carbaldehyde, carbamide and combinations thereof.

3. The method of claim 2 wherein the metal precursor is iron nitrate.

4. The method of claim 1 wherein the reactive polymer precursor is selected from the group consisting of: melamine (M), formaldehyde (F), urea (U), imidazolidinyl urea (IMDZU), Diazolidinyl urea (DAZU), and pyrrole-2-carboxaldehyde (2-PCA) and combinations thereof.

5. The method of claim 1 wherein the metal precursor is a precursor of iron.

6. The method of claim 5 wherein heat treatment comprises a first pyrolysis conducted at a temperature above 750° C. and below 900° C.

7. The method of claim 1 wherein heat treating the dispersed precursors comprises pyrolysis.

8. The method of claim 1 wherein suitable conditions to enable insitu polymerization comprises the addition of an acid.

9. The method of claim 8 wherein the acid is $H_2SO_4$.

10. The method of claim 1 further comprising a second pyrolysis.

11. The method of claim 1 wherein the sacrificial template coated with a reactive polymer containing dispersed electrocatalytic material precursors is ball milled to form a fine powder prior to pyrolysis.

12. An unsupported catalytic material comprising a plurality of highly dispersed active metal sites and a substantial portion of carbon and nitrogen derived from polymer formed from melamine, carbaldehyde, carbamide, formaldyhyde, imidazolidinyl urea, Diazolidinyl urea, pyrrole-2-carboxyaldehyde, or a combination thereof.

13. The unsupported catalytic material of claim 12 wherein the unsupported catalytic material has a surface area of at least 300 $m^2g^{-1}$.

14. The unsupported catalytic material of claim 12 wherein the active metal sites are formed using a metal precursor and the metal precursor is a precursor of iron.

15. The unsupported catalytic material of claim 12 wherein the active metal sites are formed using a metal precursor and the metal precursor is iron nitrate.

16. An unsupported catalytic material comprising a plurality of highly dispersed active metal sites and a substantial portion of carbon and nitrogen derived from polymer formed from melamine, carbaldehyde, carbamide, formaldyhyde, imidazolidinyl urea, Diazolidinyl urea, pyrrole-2-carboxyaldehyde, or a combination thereof formed by:

providing sacrificial template particles;

simultaneously templating a mixture of reactive polymer precursor and a metal precursor onto the sacrificial template particles under suitable conditions to enable in situ polymerization of the reactive polymer precursors to produce a sacrificial template coated with a reactive polymer containing dispersed electrocatalytic material precursors;

heat treating the dispersed precursors; and removing the sacrificial template particles to produce a highly dispersed, self-supported, high surface area catalytic material.

17. The unsupported catalytic material of claim 16 wherein the sacrificial template coated with a reactive polymer containing dispersed electrocatalytic material precursors is ball milled to form a fine powder prior to heat treatment.

18. The unsupported catalytic material of claim 16 wherein the unsupported catalytic material has a surface area of at least 300 $m^2g^{-1}$.

* * * * *